United States Patent [19]

Molnar et al.

[11] Patent Number: 5,166,886

[45] Date of Patent: Nov. 24, 1992

[54] SYSTEM TO DEMONSTRATE AND SELL COMPUTER PROGRAMS

[76] Inventors: Charles E. Molnar, 471 Toft La., Webster Groves, Mo. 63119; Alan L. Backus, 1550 Centinela Ave., No. 210, Los Angeles, Calif. 90025

[21] Appl. No.: 832,627

[22] Filed: Feb. 12, 1992

Related U.S. Application Data

[63] Continuation of Ser. No. 387,538, Jul. 31, 1989, abandoned.

[51] Int. Cl.[5] .............................................. G06F 3/08
[52] U.S. Cl. ............................... 364/479; 364/286.6; 364/DIG. 1; 380/4
[58] Field of Search ............... 364/479, 286.6, 401, 364/410; 360/15, 60; 380/4; 340/825.35

[56] References Cited

U.S. PATENT DOCUMENTS

| | | | |
|---|---|---|---|
| 3,602,891 | 8/1971 | Clark et al. | 364/900 |
| 3,947,882 | 3/1976 | Lightner | 360/15 |
| 4,247,106 | 1/1981 | Jeffers et al. | 364/410 |
| 4,264,925 | 4/1981 | Freeman et al. | 358/86 |
| 4,414,467 | 11/1983 | Gould et al. | 235/380 |
| 4,446,519 | 5/1984 | Thomas | 364/300 |
| 4,550,350 | 10/1985 | Billings | 360/15 |
| 4,623,920 | 11/1986 | Dufresne et al. | 358/122 |
| 4,654,799 | 3/1987 | Ogaki et al. | 364/479 |
| 4,725,977 | 2/1988 | Izumi et al. | 364/479 |
| 4,903,296 | 2/1990 | Chandra et al. | 380/4 |
| 4,905,280 | 2/1990 | Wiedemer | 364/410 |
| 4,949,187 | 8/1990 | Cohen | 360/15 |
| 4,949,248 | 8/1990 | Caro | 364/401 |
| 4,949,257 | 8/1990 | Orbach | 364/479 |

Primary Examiner—Jerry Smith
Assistant Examiner—Patrick D. Muir
Attorney, Agent, or Firm—Fleit, Jacobson, Cohn, Price, Holman & Stern

[57] ABSTRACT

Centralized broadcast of a plurality of computer programs through a point to multipoint communications medium to a plurality of computers able to select, receive and execute computer programs from within said plurality of computer programs. Computer programs to facilitate the purchase of one or more computer programs from within the plurality of computer programs, and the computer programs to facilitate purchase being transmitted through the point to multipoint communications medium.

22 Claims, 3 Drawing Sheets

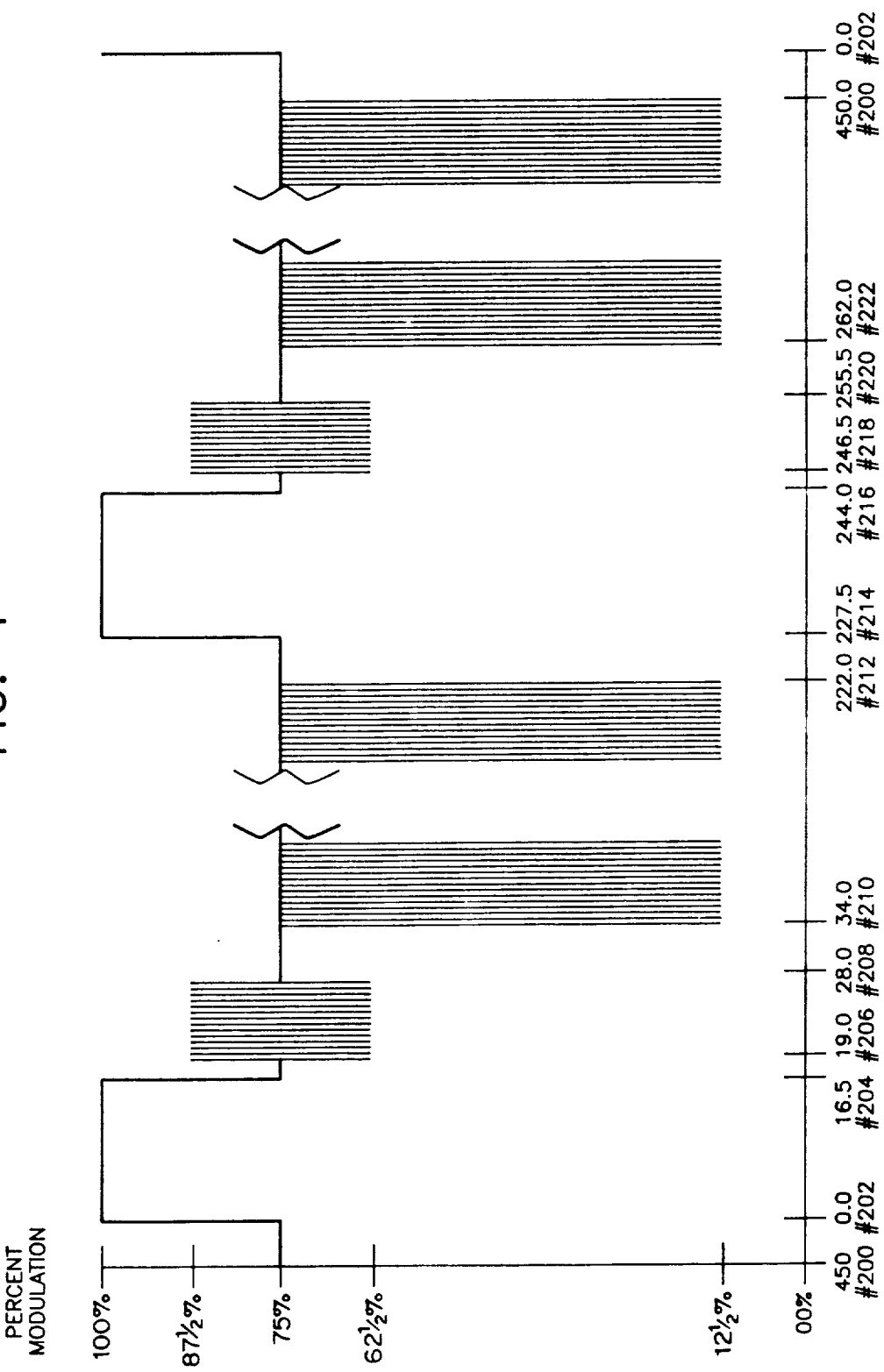

SYSTEM TO DEMONSTRATE AND SELL COMPUTER PROGRAMS

This application is a continuation of application Ser. No. 387,538, filed Jul. 31, 1989, now abandoned.

BACKGROUND

1. Field of the Invention

This invention relates to a system to demonstrate and sell computer software.

2. Description of Prior Art

Today, no methods exist to conveniently demonstrate computer software to the public. Consumers rely on magazine ads, magazine articles, word of mouth, limited demonstration programs, and brief store demonstrations to make their buying decisions. Such information is insufficient for most consumers to judge whether a given computer program will adequately meet their particular needs.

Unlike many other products where features are obvious, computer programs typically have many characteristics which aren't apparent until after many hours of use.

Even where there is certainty that a program will meet a consumer's needs, there can still be uncertainty associated with whether the program will work with a consumer's hardware.

Consumers may also face difficulty finding vendors for particular programs because the number of computer programs available is too large to be stocked locally by most retailers. Customers also encounter uncertainties concerning whether purchased software represents the most up to date versions.

Software authors and publishers have yet other problems associated with software distribution. Because present promotional means are expensive, and inadequately, and in many cases, incompletely represent computer program features, it's very difficult and costly to stimulate product demand, even for very good programs.

Software retailers must deal with yet a different set of problems associated with computer program distribution. Many computer models may be able to run thousands of software titles, each of which may be periodically updated with new versions. This means retailer inventory and spoilage costs are significant.

Several answers to these problems have been proposed. Ogaki et al (U.S. Pat. Nos. 4,674,055, 4,654,799, and 4,672,554) proposed placing vending machines in stores. These units would display video excerpts from software on a screen, but they wouldn't allow program use unless a program were purchased. Without adequate demonstration, or instructions, or the ability for the consumer to try the software on the hardware for which the software is being purchased, Ogaki et al, at best, offered a limited solution. Izumi et al (U.S. Pat. Nos. 4,725,977 and 4,597,058) proposed selling computer programs by having them recorded onto blank or reprogrammable cartridges. Besides having limitations of only working with computers able to access program cartridges, this system provides no instructions on program use, and requires purchase prior to program trial.

Edendorf (U.S. Pat. No. 4,553,252) proposed a program cartridge with means to count uses, thus enabling such cartridges to be rented on a per use basis. Providing rental costs were low and instructions were supplied, this would allow adequate preview of a program before purchasing it, but it would still be inconvenient and limited to cartridge based computers.

The present invention improves on prior art in several ways. It allows trial use of software programs on the hardware which the programs will be eventually used. The present invention permits potential customers trial use of software programs for extended durations ranging from hours to weeks. The present invention offers the most convenient method for purchasing software with both trial use and purchase being conducted within the potential customer's home. The present invention offers a system of retailing software which is significantly lower in cost than competing retail systems.

The present invention offers may other advantages over prior art which readers will find from a consideration of the ensuing description and the accompanying drawings.

SUMMARY OF THE INVENTION

The present invention provides extended trial use of computer programs before purchase on the computer hardware intended to eventually run the programs. The present invention distributes these programs in their entirety, or virtual entirety, for trial, using transmission through cable television lines or open air or the like. It provides potential customers the convenient opportunity to purchase programs from their computer sites directly before or after program trial use.

DETAILED DESCRIPTION OF PREFERRED EMBODIMENT

Definitions

The following glossary is provided for terms unique to the technology of the present invention.

Broadcast stream - signals carrying present invention programming in organized bit stream form.

Broadcast ring - information contained in one repetition of the program broadcast cycle of the present invention.

Receiver/computer - hardware which can identify and retrieve present invention program elements from the broadcast stream.

Computing device - computer portion of receiver/computer.

BRIEF DESCRIPTION OF DRAWINGS

FIG. 4 is a digrammatic representation of how information is transmitted, according to the present invention.

DESCRIPTION OF OPERATION

Figure 1:
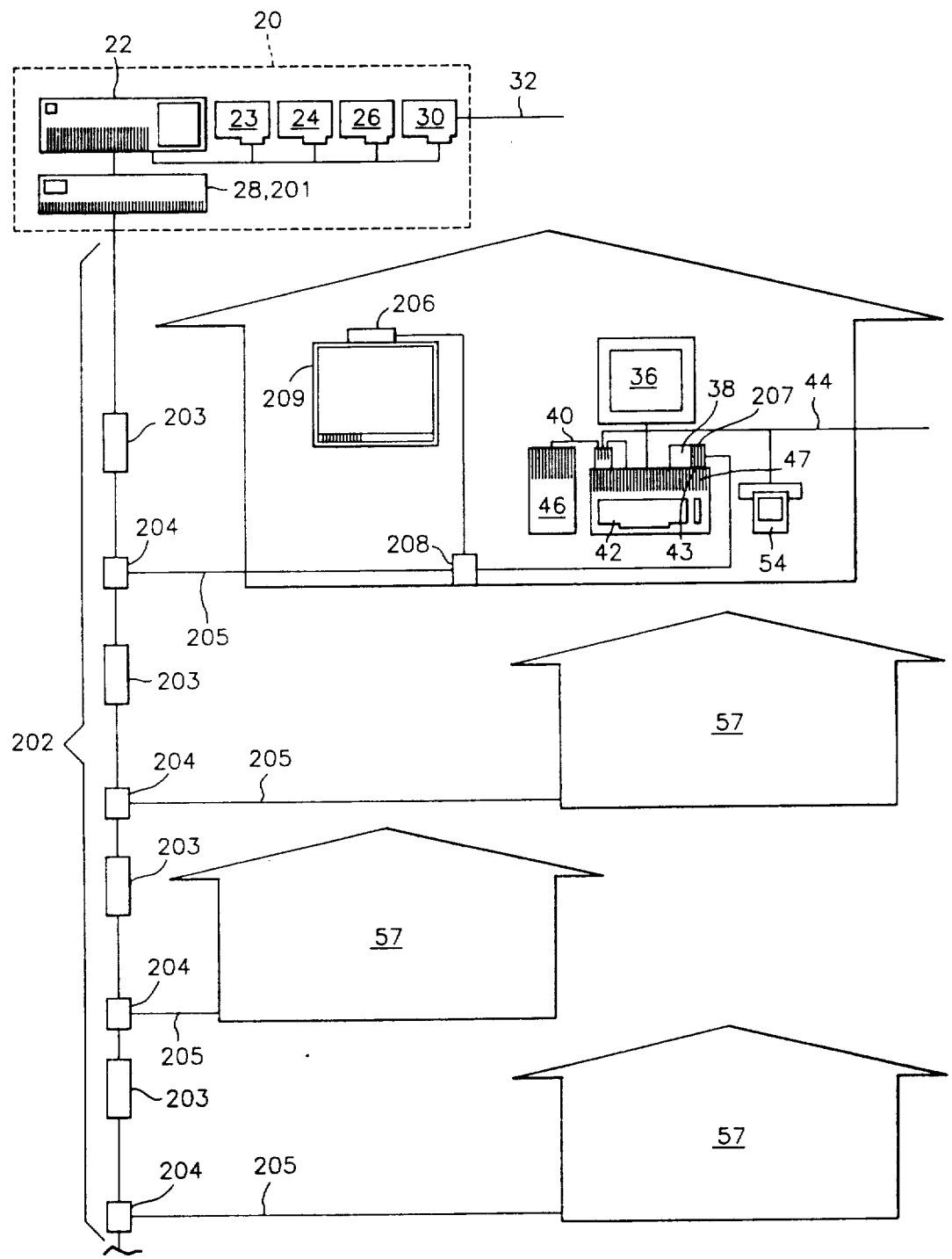
FIG. 1 is a diagrammatic representation of the present invention's preferred embodiment.
Figure 2:
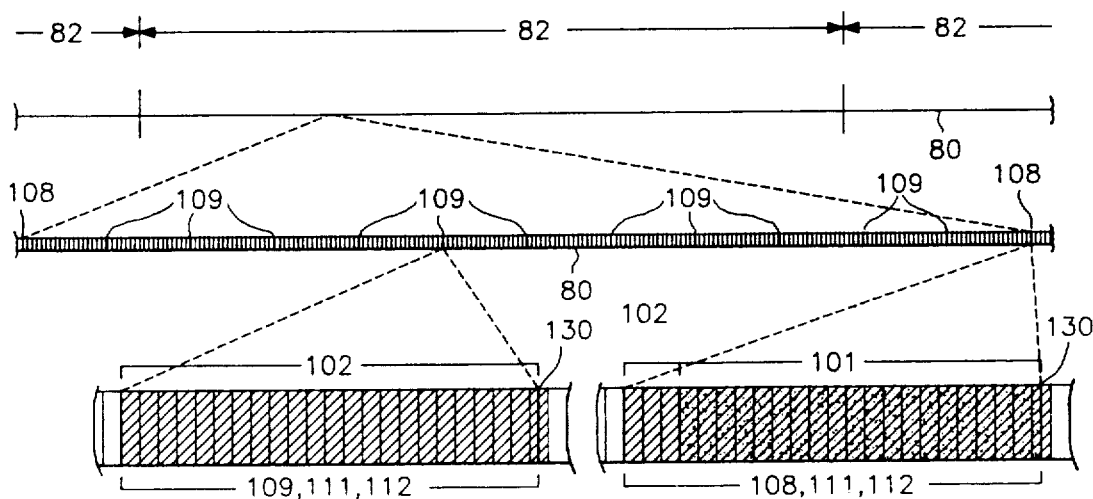
FIG. 2 is a diagrammatic representation of the organization of the broadcast stream employed by the present invention's preferred embodiment.
Figure 3:
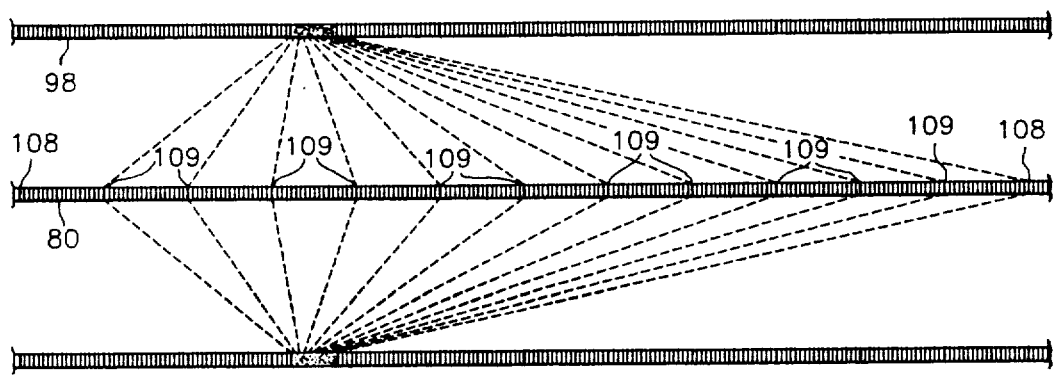
FIG. 3 is a diagrammatic representation of how the present invention's preferred embodiment organizes information to be broadcast.

Referring to FIG. 1, the preferred embodiment of the present invention vends computer programs by providing trial use of said programs to potential customers via television cable transmission, and by simultaneously offering means through said cable television transmission for the purchasing said programs for continued use, with said purchase transactions utilizing telephonic communication.

The preferred embodiment has apparatus broadly divided into four parts.

1) The Transmitting Unit #20: stores information to be broadcast including the computer programs to be vended; organizes said information for broadcast; and broadcasts said information.

2) The Transmission Network #202 provides point to multipoint distribution of the information originating from the Transmitting Unit #20.

3) The Computer Sites #34 #57: provide apparatus for trial use of said programs, and have apparatus to place sales orders for said programs.

4) The Authorization Site(s) #212: is (are) the site(s) where sales orders are received and fulfilled.

Referring once again to FIG. 1, a limited set of computer programs and related information is stored in a transmitting unit #20, that is located at a central site. Said information is repeatedly broadcast on a communication network that makes said information accessible to receiving units at multiple sites #34 #35 #57. In the preferred embodiment, said central site is the head end facility of a community cable television system, and said information is broadcast through said community cable television system, in a manner similar to that described in U.S. Pat. No. 3,602,891 [Clark, Molnar, "Continuous Transmission Computer and Multiple Receiver System"]. In said preferred embodiment, the broadcast information of this invention is contained within the signal spectrum of one or a multiplicity of television channels according to the allocation of frequency that is used by the particular community cable system, in such a way that services provided through other channels not used for the purposes of this invention are not disrupted by the signals used for this invention.

In alternative embodiments, other broadcast mediums may be used including open air RF broadcast, fiber optic broadcast etc. Also, other methods of encoding the signals may be used for transmission on a cable system or through other medium. Such encoding methods may distribute the information over a portion of the spectrum that does not correspond to television channel allocations. In some cases, an entire cable distribution network may be used for the purposes of this invention, with no other services such as television broadcasting using the cable network at all.

The set of computer programs that is stored and broadcast according to this invention may include but are not restricted to:

1) programs for trial use and demonstration as inducements to purchase;

2) programs in a form ready for sale for continued use;

3) programs for unlimited free use;

4) programs that perform functions that support the vending system, such as user instruction, order entry, order placement via telephone dial-out, purchase validation, user verification, billing, access control, etc.;

5) programs that provide entertainment, education, information, and other services that will attract users to the vending system;

6) information needed to present graphics, sound, and other communication to users; and 7) coding, security, formatting, and other information incidental to the operation of the vending system.

During operation of the transmitting unit #20, materials to be broadcast, including the set of computer programs to be previewed, are retrieved from broadcast memory #24, which may be partially or entirely volatile or non-volatile; random-access, serial-access, or block-access; static, dynamic, or read-only; semiconductor, magnetic, or other technology; and optionally backed with secondary storage #26 such as hard disk, battery backed RAM, floppy disk, magnetic tape, optical storage, or other devices with or without removable storage media.

In the preferred embodiment, the information that is stored in processor memory #23, broadcast memory #24, and backup storage #26 is loaded and updated remotely using phone lines #32, modems #30, and established phone communications protocols. Other embodiments of the present invention might use satellite feed; or removable media such as floppy disks or magnetic tape or optical media; or other information conveyance means. Various established communication techniques, equipment, and protocols may be used for conveying this information to the transmitting unit #20. Alternatively, all or part of the information may be provided by using read-only memory devices as components of memories #23, #24, or #26 that can be physically replaced to provide updated information.

In the preferred embodiment, loading and updating of information to be broadcast, or of information needed to operate the various functions of transmitting unit #20, are controlled by processing unit #22. This unit may replace the entire contents of broadcast memory #24 with new material, selectively replace portions of the material already stored in broadcast memory #24, selectively delete portions of the material already stored in broadcast memory #24, selectively add new material to the material stored in broadcast memory #24, verify the correctness of material stored in broadcast memory #24, or any combination of the above functions. In the preferred embodiment, within the transmitting unit #20 is a stored program microcomputer that executes instructions from processor memory #23. Processor memory #23 and broadcast memory #24 may be physically distinct units, or may be comprised of a single physical unit used for both purposes. All or part of the memories #23 and #24 may be read-only memory (ROM) or writable memory.

Information is organized within broadcast memory #24 in such a way as to make it rapid and convenient to access for broadcast transmission. In the preferred embodiment, information is organized into blocks that each contain the same fixed amount of information. In other embodiments, blocks of non-uniform size might be used. A portion the information in a block is header in formation #10, which is used to identify the block so that it can be selectively received by receiving unit #38. The header may also contain (but may not limited to) information used to:

1) verify the accuracy with which the block has been received (by means of check sum or cyclic redundancy check or similar techniques);

2) convey encryption information needed to interpret the information in this or other blocks;

3) convey validation information needed to control access to the information in this or other blocks;

4) contain information used by the transmitting unit to identify, schedule, classify, modify, or select blocks as needed to assist the transmitting unit to perform its various functions;

5) satisfy the timing or protocol requirements or both of the transmission network #202, the modulator #201, or the demodulator #207; or 6) select or specify the individual receiving unit or class of receiving unit or user that is enabled to access this or other. blocks.

A second portion of the information in a block is the body #102, which contains the information that is to be loaded into the memory of a receiving unit #38 that has selected said block. Some or all of the information serving the six purposes listed above may alternatively be transmitted in the body rather than in the header of a block or blocks, and information contained in the header may also be loaded into the receiving unit memory.

The amount of information that is contained in the entire block, and in the header and body portions, may be the same for all blocks, or there may be blocks of different sizes, with headers that contain different amounts of information, and with bodies that contain different amounts of information.

Unless otherwise stated, the following section describes a preferred embodiment of the invention. In said preferred embodiment, a block is further divided into multiple lines #111, each capable of containing 188 bits of information. 12 of said lines #111 comprise a block. Each line #111 is transmitted during a single horizontal scan time of a National Television Standards Committee (NTSC) standard signal. The first four bits (tag bits #130) of each line #111 contain information that identifies whether the line is the first line #108 of the twelve lines that comprise a block, or one of eleven continuation lines #109.

The remaining 184 bits of a line are grouped into 23 8-bit bytes #110 of information. The first 20 bytes of the first line #108 comprise the header #101 of the block; the remaining 3 bytes of the first line, along with the 253 bytes of the remaining eleven continuation lines #109 of the block, comprise the body #102 of the block, which thus contains 256 bytes of information.

In said preferred embodiment, the transmission network #202 is a community or an institutional cable television system that broadcasts single- or multiple-channels of such NTSC television signals, normally encoded within a 6 megaHertz frequency band. Cable television systems typically provide many such frequency bands, each allocated to a different television channel or service. It is the intent of the preferred embodiment to encode lines within a signal that is similar to an NTSC signal, so that it can pass through any normal cable television system, including its modulators #28, amplifier #203, taps #204, drops #205, and decoder #206 without interference to other services and without interference from other services or degradation by the transmission network #202 that would produce unreliable operation of the invention.

Techniques for accomplishing these purposes are well-known to the art, and are used for example to encode information in the vertical blanking intervals of video broadcasts. Commonly used techniques exist that retain the blanking, synchronizing, and color burst components of a NTSC signal, and use them to synchronize the modulation and demodulation of serial digital information that is inserted into the portions of the NTSC signal that normally convey video information during a horizontal scan. In the preferred embodiment of the invention, the vertical blanking and synchronizing components of the NTSC signal are omitted, but the horizontal blanking and synchronizing components and the color burst component are retained, and used to synchronize the demodulator #207 so that it can reconstruct the 188 bits that comprise each transmitted video line #112. All horizontal scan intervals, or a portion of them, may be used for the transmission of lines.

A preferred means for encoding digital information makes use of a horizontal synchronizing pulse and color burst similar to those used in an NTSC television signal to determine the timing of the encoding and decoding of a bit-serial form of the digital information within the portion of an NTSC horizontal line that is usually used to contain video information. The horizontal synchronizing pulse defines the beginning of a line; the color burst defines the timing of individual bits within the video portion of a line.

The duration of a single horizontal scan line is equal to 227.5 cycles of the color burst frequency of 3,579,545 cycles per second. In the preferred embodiment, the important events during a consecutive pair of horizontal scan lines all occur at times that are referred to the color burst phase. The color burst is a group of 9 cycles of sinusoidal signal at the color burst frequency that is transmitted in a specified time interval following the end of a horizontal synchronization pulse. The time of important events in the signal is conveniently indicated by giving the number of color burst cycles since the time of the leading edge of the horizontal synchronizing pulse If the signal uses the interlacing structure that is defined in the NTSC standard, the timing relationships are slightly difference in a given line and the following line, so it is necessary to define the signal timing for an interval that includes two consecutive lines. This pattern is repeated by successive pairs of lines. The first line of such a pair is called "even", the next is called "odd".

The following table defines the times of critical events relative to the leading edge of the horizontal synchronizing pulse for an even line:

| FIG. 4 ref. # | Cycle | Event |
|---|---|---|
| 202 | 0.0 | Horizontal synchronizing pulse leading edge |
| 204 | 16.5 | Horizontal synchronizing pulse trailing edge |
| 206 | 19.0 | Color burst begins (even line) |
| 208 | 28.0 | Color burst ends (even line) |
| 210 | 34.0 | Digital signal begins (even line) |
| 212 | 222.0 | Digital signal ends (even line) |
| 214 | 227.5 | Horizontal synchronizing pulse leading edge |
| 216 | 244.0 | Horizontal synchronizing pulse trailing edge |
| 218 | 246.5 | Color burst begins (odd line) |
| 220 | 255.5 | Color burst ends (odd line) |
| 222 | 262.0 | Digital signal begins (odd line) |
| 200 | 450.0 | Digital signal ends (odd line) |
| 202 | 455.0 | End of line pair (0.0 of next pair) |

The digital signal is encoded serially during the interval from 34.5 to 222.5 cycles, and from 262.0 cycles to 450.0 cycles, by selecting one signal level for a "0" and a different signal level for a "1". The length of the interval available for digital encoding during each horizontal line video interval is 188.0 cycles of the color burst frequency. One bit is encoded during each cycle. It is convenient to choose the level that would normally indicate "black" in video transmission to encode a "1", and the level that would indicate "white" to encode a "0".

The 188 bits encoded in a horizontal line comprise 23 bytes of 8 bits each, plus four additional bits. The 23 bytes convey the information that is to be communicated to the receiving apparatus; the additional four bits are transmitted at the beginning of a line and are used to distinguish the first line of a block from continuation lines, and may optionally be used to distinguish normal blocks that carry information to be loaded into the receiver from special blocks, such as blocks used to convey information used for decryption, error correction, or other special purposes.

In the preferred embodiment, the signal just described is generated at signal levels that correspond to standard practice for NTSC video signals, and is used as the video input to a standard television channel modulator. This modulator generates an output signal in a six megaHertz frequency band allocated for this service. The rise and fall times and frequency spectrum of this synthesized video signal are controlled by filtering or other means so that the vestigial-sideband amplitude-modulated signal that is produced by the modulator is compatible with normal video signals that may be transmitted on frequency bands allocated to other services in the same cable.

In other embodiments, the invention may use portions of the cable spectrum that are narrower or wider than the 6 megaHertz band of a typical television signal. It may also use techniques other than frequency-division multiplexing in order to permit sharing of the transmission system with other services, such as time-division multiplexing of digital signals with the signals of other services. Different effective bit transmission rates may be used, with a variety of modulation and encoding techniques. This invention requires only that the network can communicate signals of adequate transmission rate in one direction, from the transmitting unit #20 to one or more receiving units #38, and does not depend in any way upon the ability that some cable television systems may have for conveying signals in the opposite direction.

Returning to the description of the preferred embodiment, the sequencing of blocks and lines in the broadcast stream is as follows. The first line #108 of a block #100 contains a block number #120 that identifies that block. The lines that comprise a particular block are not transmitted during consecutive horizontal scan intervals, but rather some number of scan intervals separate the transmission of the successive lines of a block. In the preferred embodiment, each successive line of a block is transmitted N horizontal scan intervals following the preceding line of that block. N may be fixed number for all blocks, as it is in the preferred embodiment, or it may have different values for different blocks.

The purpose of having an interval separating the lines that comprise a block is that this allows time for the receiving apparatus to examine the block number and other information that is contained in a line, and to make decisions and execute procedures that are needed to process the line that was just received or prepare for the reception of the next line of the block. In particular, in the preferred embodiment, a value of N=19 allows sufficient time that these operations can be performed by programs operating in the computer #42 or video game system 45 (such as typified by the Nintendo NES) both hereinafter interchangeably referred to as "the computer #42 that is part of the receiving unit #38, making it unnecessary for the receiver interface unit to perform these operations.

There is a particular advantage in choosing N so that it is relatively prime with respect to the number of lines M in a block. This allows an efficient interleaving of lines that allows all of the following requirements to be satisfied:

1) The lines comprising every block are spaced at uniform intervals of N horizontal scans;

2) The first line #108 of successive blocks can be spaced at uniform intervals of M horizontal scans;

3) The lines that comprise a sequence of any number of blocks can be transmitted in a way that makes use of every horizontal scan, once the first N blocks have been transmitted;

4) If blocks are transmitted in such an order that their block numbers #120 are in ascending order, the sequence of first lines #108 of these blocks will contain the block numbers in the same ascending order; and 5) There is a time interval of (M−1) horizontal scans separating the transmission of the first lines #108 of any consecutive blocks.

In the preferred embodiment, the receiving apparatus makes use of conventional means for selecting the frequency band used for transmitting the digital broadcast signal, and demodulating the signal into a composite video signal that reproduces the video signal that was provided to the modulator that generated the transmitted signal. The receiving apparatus may use conventional techniques common in television receivers, such as automatic gain control, automatic frequency control, surface acoustic wave intermediate frequency filters, and synchronous demodulation, to improve the fidelity with which the original video signal is reproduced. It may use manual or electronic control to select the frequency band to be received, so that multiple bands carrying a digital broadcast signal may be received. This selection may optionally be under the control of the computer #42, or may be made manually. The same apparatus may also be optionally used to receive video signals for other purposes, such as television viewing, in order to share the cost of the apparatus over multiple uses. The horizontal synchronizing signal and color burst signal are separated from the demodulated video signal by conventional means. The color burst signal is used to phase- and frequency-lock a local crystal oscillator that operates at the color burst frequency of 3,579,545 cycles per second, using means that are conventionally used for the reception and decoding of NTSC color video broadcasts. This local color oscillator signal, and the horizontal synchronizing pulse, are used to determine the instants at which the composite video signal is sampled to recover the serial binary data that are encoded in it. One sample is taken for each cycle of the local color oscillator.

This recovered serial digital signal is input to a conventional shift register circuit, whose contents are shifted once in every color clock cycle and assembled into 8-bit bytes or other convenient groupings. This information is then provided to the receiver interface unit for further processing and interpretation.

The receiver interface unit #38 is equipped to identify a video line #112, and determine whether it is a first line #108 or a continuation line #109, and if it is a line of the specific type desired, to receive and store the 23 bytes of information that it contains. The receiver interface unit #38 is controlled by the computer #42, which specifies to the receiver interface unit #38 the next type of line that it should detect and store. When such a line has been detected and stored, the receiver interface unit #38 signals the computer #42, by means of a signal flag, program interrupt, DMA transfer, or similar means, that a line is ready. The computer #42 then accesses the bytes that are stored in the receiver interface unit #38, by means such as address-mapped I/O, and carries out whatever procedures are necessary to identify the information that has been received, and, if required, transfer it to storage locations in the memory, processor, or peripheral devices of the computer #42.

A representative procedure that is used for searching and loading a specific block follows:

The computer #42 directs the receiver interface unit #38 to identify and store the next first #108 line. The receiver interface unit detects the next video line that contains the proper code in its tag bits #130, and stores the information contained in that line. In then signals the computer #42, which compares the block number that has just been stored with the number of the desired block. If they do not agree, the computer repeats the same direction to the receiver interface unit, which can be done in sufficient time that the very next first line can be identified and stored by the receiver interface unit.

If the block numbers agree, no such repeated direction is given to the receiver interface unit, and it begins to count successive horizontal scans and prepares itself to read the Nth following line, which should be a continuation #109 line. While this is taking place in the receiver interface unit #38, the process of transferring the block is begun by the computer #42. First, the last three bytes of the first line, which are part of the body #102 of the block, are transferred by the computer #42 from the receiver interface unit #41 to storage locations within the computer. Any other header bytes, such as error detection or correction codes, are also transferred in the same way. Once this has been done, the computer may execute other tasks until the next line of the block is received by the receiver interface unit.

When the proper number of horizontal scans has been counted, and the continuation line has been stored by the receiver interface unit, the computer #42 is again signaled. It then accesses the 23 bytes of the first continuation line, and in general transfers them into its memory #47. The receiver interface unit #38 once again begins counting horizontal scan lines, in preparation for transferring the second continuation line of the block. This process is repeated until all of the continuation lines of the block have been received and transferred into the memory #47 of the computer #42.

Several types of error may occur in this process, as a result of incorrect reception of a video line, equipment failure, or failure of the computer #42 to complete its tasks in time to interact properly with the receiver interface unit. The receiver interface unit #38 has means to signal such failures that it can detect by setting flags in a status register. In addition, the header of a block or the body of a block may contain redundant information that may be used according to a variety of well-known techniques to detect many types of errors in the values of received information, and possibly to correct these errors. The full resources of the computer #42 are available to carry out these error detection and correction tasks; it should be noted that programs for the computer #42 to carry out these tasks may optionally be loaded from the broadcast stream.

In the preferred embodiment, the program or other information that is to be loaded into the receiving unit #38 from the stream of information that is sent out from the transmitter may include one or more distinct blocks, each with a distinct block number. The loading operation that is carried out by the receiving unit consists of a number of steps that are carried out by the joint operation of the computer #42 and the receiver interface unit #38. One of these steps, the loading of a block with a specific block number into the memory #47 of the computer #42 has already been described. The following description explains in further detail how error detection and repetition of transfers containing errors can be carried out, and how programs or other information contained in more than one block can be loaded efficiently into computer memory.

We shall call a set of one or more blocks that is to be loaded into computer memory as a unit a block package #300. It is possible that the same block or blocks may be contained in distinct block packages; for example a block carrying a standard subroutine, or fonts for a particular character set, my be contained in many block packages. In the preferred embodiment, the order in which blocks are sent out by the transmitting unit #20 is chosen so that block numbers of successive blocks increase monotonically from the smallest block number to the largest. After the block with the largest number has been sent, the process is repeated. Each such transmission of successive blocks, starting with the block having the lowest block number and ending with the block having the largest block number is called a broadcast cycle #82.

When a block package is to be loaded, the block numbers of all of the blocks that are contained in the block package are known. Because the blocks are transmitted with their block numbers in increasing order, it is possible to ensure that all of the blocks comprising a block package can be loaded during a single broadcast cycle #82. This is done by listing the numbers of the blocks in the block package in ascending order, and then loading blocks in a sequence corresponding to the order of their block numbers on the list. It is also necessary that the first line #108 of a block that is included in a given block package be transmitted enough after the last continuation line #109 of the preceding block in the same block package, so that the loading of the preceding block can be completed and the searching process for the following block can be started before the occurrence of the first line #108 of the following block in the block package. In this way, blocks can be loaded in the order in which they are transmitted in a single broadcast cycle.

In a modification of this method, the receiving unit first loads a first line #108, and from it determines the number of the block that is currently being broadcast. This block number is increased by the addition of an offset value, and the block numbers of the blocks in the block package are listed in the following order:

1) the smallest block number that is larger than the offset block number;

2) other block numbers of blocks in the block package, in ascending order, until the largest block number is listed;

3) the numbers of the remaining blocks in the block package, starting from the smallest, in ascending order.

In a further modification of this method, blocks to be broadcast can be grouped into subsets of blocks, such that all of the blocks in any block package are contained in at least one of these subsets. The blocks in each subset are labelled with an identifying code that is contained in the header so that the subset or subsets that each block belongs to can be determined by examining the header information.

During the searching process, described earlier, any block that is not in the subset that contains the desired block package #220 is rejected, without examination of its block number. With this technique, it is possible to consider the blocks in each subset as forming a distinct broadcast cycle #82, with the orderings of block numbers among the blocks in each subset being ascending, as described above, but with no ordering required between blocks in different subsets. In this way, the broadcast cycles of different subsets may contain differing numbers of blocks, may require different amounts of time to complete one cycle, or both of the above. This subset arrangement makes it possible to load all of the blocks in a block package within effectively the broadcast cycle time of its particular cycle. Thus, frequently used or high-priority programs or other information can be loaded with less delay than infrequently used or low-priority programs or other information.

When an error in loading a block is detected, a method for recovery of the correct block information is to repeat the loading of that block. If this is attempted immediately, the time of an entire broadcast cycle #82 is required until the same block is transmitted again. If an error occurs in loading more than one block in a block package, this method would require that the time of a full broadcast cycle #82 be taken to recover each of the blocks that contained an error.

In an improved method, the number of any block that has been read incorrectly is simply appended to the list of block numbers that is to be loaded, as described earlier. As was explained, all of the blocks identified by that list can generally be loaded in one broadcast block cycle, so the loading of all blocks can be completed within one broadcast cycle of the time at which the last block loading error occurred. This method is especially effective in reducing the time needed for error recovery when the number of blocks in a block package is large, or when the probability of an error in loading a block is large.

The loading of blocks into the computer #42 of the receiver/computer unit is controlled in the preferred embodiment by a computer program that is held in read-only memory (ROM) of the receiver interface unit #38. In this embodiment, the computer #42 is equipped to execute programs that are stored in ROM in a plug-in cartridge. In the preferred embodiment, the receiver interface unit #38 is connected to said computer through said cartridge port. Said computer is equipped with operating system programs that are contained in ROM that is internal to said computer. When said computer is reset, or its power is turned on, the operating system program examines codes that are contained in the ROM plug-in cartridge to determine that initial computer operation should take place by execution of program codes stored in said plug-in ROM cartridge. The receiver interface unit #38 contains ROM which stores the necessary recognition codes, and a computer program that carries out the initial loading of broadcast programs. This is done according to the following steps:

1) First program code is executed directly from the receiver interface unit #38, plugged into the cartridge port #43 of the computer #42, copies second program code from ROM in said interface unit into random-access memory (RAM) in said computer memory.

2) Control is transferred to said second program code in RAM, which is able to search for and load blocks containing third program code into computer memory #47. This loading process may not contain full capability for error detection or recovery, so that the size of second program code can be small.

3) Control is transferred to third program code, which has capability to load, error-check, and recover multiple block packages comprising general control programs typically including features for graphics menus for user interaction and program selection, full error detection and/or correction, program relocation and memory management, copy protection, and other more general programming features. Third program code may be used to load programs to be vended, or to load fourth program code that contains even more general features for vending system demonstration and operation.

In the preferred embodiment of the invention, information to be broadcast is stored in broadcast memory #24 in the same order that it is to be transmitted, with consecutive bytes to be transmitted contained in consecutively-numbered memory address locations. This makes it possible to access the stored information in a simple way. Either direct memory access (DMA) or programmed - input/output techniques, well known in the current art, can be used to move information from the broadcast memory to the line buffer, which is used to hold the information that is needed to construct a single video line. In the preferred embodiment, a double buffer is used, such that one of the buffers is providing the information needed to construct the current video line, while the other buffer is being loaded from broadcast memory #24. By use of this method, the timing of delivery of information from broadcast memory is less critical than it would be if information were to be delivered directly from broadcast memory to the video line encoding circuit.

Other embodiments are possible, including the use of a first-in-first-out (FIFO) buffer that is loaded from broadcast memory and delivers its output to the video line encoding circuit, or including a DMA transfer means able to deliver information from broadcast memory with sufficiently precise timing. Many buffering techniques such as these are well known to those experienced in the computer interfacing art. Other embodiments are possible in which the information to be broadcast is organized in a different order in broadcast memory from the order in which it is to be transmitted. Such embodiments are preferred when it is desired to organize the broadcast stream into multiple broadcast cycles, as was described earlier. In such cases, it is preferred to employ a more complex method of storing information in broadcast memory #24, and to use programmed input-output or other more complex accessing techniques to select the correct information from broadcast memory and transfer it in the correct order to the video line encoder. For example, the information in each subcycle may be stored in a separate array in broadcast memory, in ascending address order within each array, and a separate address pointer assigned for each subcycle. In this method, each successive video line contains information from a distinct subcycle, and is constructed with information obtained from broadcast memory under the control of the address pointer that is assigned to that subcycle. Each succeeding video line can then be constructed under the control of a different address pointer. In a simple method, each of the address pointers is used in turn, until all have been used, and then the first address pointer is used again, with other address pointers used again in turn. More complex addressing techniques are also possible, but it is a feature of this invention that it is not necessary for the selection of information to be transmitted to be made in response to a specific request from a particular user or group of users. Rather, the order of accessing and transmitting information stored in broadcast memory is carried out in a pre-defined pattern that is intended to make it possible for a large number of users with a variety of needs to receive efficiently the information that is being broadcast.

This is not meant to restrict the adjustment or modification of the information stored in broadcast memory from time to time, or the making of modifications and variations in the order and the time interval separating repetitions of the broadcast of particular parts of the stored information so as to better match the needs of users. Such adjustment or modification may take place at regularly assigned times, such as between the hours of 2 AM and 3 AM, episodically whenever new information is ready or needing to be added, or continuously while information is being broadcast.

Whenever there is modification of the information stored in broadcast memory #24, or adjustments in this information or the order in which it is tranmitted, an updating process takes place. In a preferred embodiment described earlier, where bytes are stored in broadcast memory #24 in the order that they are to be broadcast, processing unit #22 receives the new or updated information in a format that is convenient for communication from the source of this information. Programs executed by said processing unit rearrange this information and store it into specified locations in broadcast memory #24 that correspond to the place in the broadcast stream #80 that is to be occupied by the new or updated information.

This organization includes dividing programs into subcomponent broadcast blocks of a fixed size, each block with a header which identifies: program affiliation, block placement in computer memory, number of blocks in program, block identification, and model of computer to run the program. The processing unit #22 interleaves broadcast blocks from different programs in such a manner that computers #42 at computer sites #34 #57 have adequate time to receive and store all blocks from any selected broadcasted program within one cycle of program broadcast. This is accomplished by blocks belonging to each broadcasted computer program being spaced apart by blocks belonging to other broadcasted programs, as was describe earlier.

A conforming copy of this information, ordered as it is ordered in broadcast memory, may optionally be stored in backup storage #26 so that corruption or loss of information in said broadcast memory can be rapidly and easily corrected.

Alternatively, information may be stored in backup storage #26 in a different order than the order in which it is broadcast. In the preferred embodiment, processing unit #22 controls said movement of information between broadcast memory and backup storage.

The transmitted signal is received at computer sites #34 #57 located in homes or other sites accessing the television cable. At the computer sites #34 #57, a receiver #38 operating under computer #42 control (hereafter referred to as "receiver #38/computer #42") selectively tunes to a channel that is carrying the signal described earlier. The selection of the channel may be fixed by the design of the receiving apparatus to a single channel, or the apparatus may provide a means for selecting from a multiplicity of channels under manual control of the user or of a service technician, or the channel selection may be under the control of the receiver #38 itself, or under the control of the receiver #38/computer #42.

In the preferred embodiment, the receiver demodulates and reconstitutes the signal described earlier to a serial bit stream, making use of the horizontal synchronization pulses, the color burst on the back porch, and other timing information contained in the video signal. This method is similar to that described in U.S. Pat. No. 3,602,891, Clark, Molnar, "Continuous Transmission Computer and Multiple Receiver System".

Users at computer sites #34 #57 may access broadcasted programs through a series of branching menus loaded from the broadcast stream. Implementation and operation of such branching menu systems is widely practiced and known to those knowledgeable in the art.

A first menu appears when a computer #42 is turned on. Means to load the initial elements of the broadcast stream, which in turn load the first menu and other accompanying operating software, are located in the receiver #38. An option on said first menu may offer a user access to his/her computer's original operating system and terminates use of the broadcast stream.

In the preferred use of the invention, a user may identify a computer program to be previewed through the use of said branching menus. Successive menus loaded from the broadcast stream then offer the user options for accessing such information as:

instructions for use and demonstration of programs that are being offered for sale;

instruction in procedures for purchase of the selected program by phone or other ways;

programs for education and/or entertainment that are currently available for unlimited free use;

access to other services that may be offered as in conjunction with the vending service; and instructions for obtaining authorized copies of broadcast programs for continued use.

Depending upon the accessory equipment available in a particular receiver #38, and upon methods for authorization of the making of copies of the broadcast programs and information, the user may make printed or digitally stored copies of some or all of the broadcast information. A user accepting an offer of instructions in program or system use enters information on the keyboard or other input device of said receiver #38/computer #42, under direction of the menu or other selection aid, that causes said receiver and computer to locate, retrieve and present blocks containing the selected instructions or other information. These instructions may in turn offer further options for printer presentation, screen presentation or other presentations.

Similarly, a user accepting an offer for purchase, causes the receiver #38/computer #42 to locate, retrieve and present blocks containing appropriate purchase instructions. These may include instructions for voice telephone ordering, mail ordering, or direct ordering using an interface, called a modem #40 in this patent. In the preferred embodiment, the receiver #38/computer #42 is equipped with a modem #40 interface to a telephone line #44 or other electronic communication pathway that is capable of connection to a remote order entry and authorization site #212. In a manner that is well known to the art, computers #42 can execute programs that are able to place telephone calls to specified telephone numbers, and to communicate via the modem #40 and telephone line #42 with said site #212. This site may receive calls via the public telephone network from a multiplicity of said computers.

In the preferred embodiment, a user may go through the following steps to purchase a particular computer program:

1. The user turns on or resets their computer, resulting in display of program options.

2. Selecting a program option presents an opportunity to purchase the program. A negative response to the purchase opportunity results in free program preview.

3. A positive response to the opportunity to purchase the program causes the loading from the broadcast stream into computer #42 of a program that is intended to carry out the purchase transaction.

4. The user is asked if a modem #40 is connected to their computer and if the modem is to be used in the purchase.

5. A negative response provides a telephone number for making the purchase verbally. Other information is provided the user including: the stock number for the program being ordered, the order price, the delivery time and terms of sale. An order ID number may also be provided which identifies the ordered item, the time and date, as well as identifies the computer site #34 #57 placing the order by referencing a unique serial number contained in each receiver's #38 ROM. All orders may be placed through one central order fullfilment facility or different software programs may have different telephone numbers to order though different order fullfilment locations.

6. The user dials the given telephone number and verbally conveys the displayed information as well as other information necessary to the sale such as credit card or other payment information, and a mailing address for delivery.

If a user's computer is equipped with a modem #40 and the user wishes to use their modem to place the order for the program, the user responds appropriately to item 4 above and the following steps occur:

1. Information is requested of the user including payment method, delivery address, quantity of product being ordered etc.

2. The modem #40 automatically calls an order placement facility. There may be many such facilities or one central one. Programs to collect information, to cause modems to automatically dial, and to transfer information are well known and easily implemented by those knowledgeable in the art.

3. All order information, such as described above for verbal orders, is digitally transferred through the modem #40 to computers in the order placement facility.

Regardless of order method, shipment of the purchased computer programs to the customer is done through mail, U.P.S., Federal Express or like manner.

A variation of the above of particularly great convenience to the user would substitute electronic delivery of programs for mail, U.P.S., Federal Express etc. Steps 1 through 3 above would be completed followed by:

1) Following acceptance by the central site, which might include verification of the user identification and address, a verification of the credit card or other billing reference, or the acceptance of a user subscription number or password or electronic identification number such as may be placed in ROM in the receiver interface unit 38, the central site issues a validation code or key that is received by the computer #42.

2) Said key enables the receiver #38 to access a version of the program suitable for continuing use, as well as a broadcast program that can load the vended program from the broadcast stream and copy it onto a storage medium that is available on the computer #42.

In any of the above sales transactions order placement information conveyed over phone lines, either verbally or digitally, may substitute for order placement information described above as being contained in the broadcast stream. Alternatively, radio broadcast, two way television cable, satellite communication or other communication may be substituted for use of phone or one way cable in all or part of the above computer program sales transactions.

Programs offered for preview may be protected from illicit copy through several means. First, there are no hard copies of previewed programs (i.e. floppy disk, optical disk, cassette, ROM cartridge, hard disk etc.) present at the computer site(s) #34 #57. Disk copy programs used to copy programs through disk duplication are therefore rendered useless.

A more sophisticated form of copy protection requires programs to utilize critical data which can only be acquired from the broadcast stream during the program's loading or execution. Such function renders useless, special hardware which replicates RAM to provide reusable program copies. Such techniques are well known to those knowledgeable of magnetic disk copy protection techniques.

Another protection scheme has programs check for the presence of the broadcast stream during their loading or execution.

Programs offered for preview may have all features offered by their purchasable counterparts, and they may be freely executable by computer #42 directly as they are received from the broadcast stream. They may alternatively offer restricted subsets of the features of the purchasable version, or their execution may alternatively require the use of additional information that may be acquired either from the broadcast stream, from a remote site via the modem #40, or through entry of authorization information by the user. Additional information obtained from the broadcast stream may optionally be loaded during the initial program load, and held in the receiver and accessed by instructions to the receiver #38 from computer #42, using special instructions, contained within the previewed program, that can cause transfer of said information from the receiver. This use of additional information not directly loaded into computer memory #47 may also serve to obstruct use and operation of previewed programs that are duplicated by unauthorized means.

A multiplicity of different make and model computers may access information from the same broadcast stream This can be accomplished by identifying each block #100 of broadcast information with a code, preferably contained in its header #101, that identifies the type of computer that it is accessible to. Some blocks, such as those containing text or graphics information, may be accessible by multiple types of computer Other blocks, such as those that contain executable program code, are accessible only to computers that can execute that code. The First Program Code, as described earlier, will select Second Program Code suitable for the particular type of computer, including instructions that are needed to identify blocks suitable for access by that type of computer.

Previewed computer programs may be any programs or parts of programs or groups of programs with the potential for commercial sale.

Computer sites #34 #57 where these programs may be previewed, vended or used may include offices, schools and businesses accessing community television cable, as well as dwellings.

Delivery of purchased programs may be made by mail or similar means, or electronically through the broadcast stream, phone lines or the like.

Programming may include all types of computer and video game machine software. Of particular interest is interactive software to facilitate education in various subjects including subjects conventionally taught in grades kindergarten through college. As already disclosed, the preferred embodiment of the present invention may include domecile and school computer sites. The preferred embodiment may thus broadcast software to facilitate learning of various subjects into schools during the school day, and then rebroadcast the same or similar software into homes after school hours to help in home studies. This is significant because the quality of education is correctly being criticized by many government, community and business leaders; and because computer enhanced education has been shown to be highly effective.

A typical application of this community education system would have a first grader receiving a class during school hours in a computer lab. In this class the first grader would learn how to use a couple of programs, such as one teaching simple reading skills, and the other showing basic principals of addition. These might be taught on computers or on computer game machines. The first grader could then go home and use the same programs after school hours for as long as might be required. Such programs are frequently fun for students to use, and hence typically get more use than books or other home exercises.

Educational programs would change throughout the school year. For continued use, a parent would purchase the program through the present invention's vending feature. By concurrently offering programming for all grade levels, the present invention allows superior students to accellerate their learning. The interactive nature of educational computer programs insures that students are always challenged and always aware of their progress.

Program schedules for all computer software may change regularly throughout a day, week, month or year, and programs may be broadcast for any desired length of time ranging from seconds to years with such scheduling being determined by factors including sales rates, demographic viewer profiles etc.

Previewed programs may induce wide usage by providing value other than assuring adequacy of computer program purchases. Such value may include, but is not limited to: enhancing education, providing entertainment, facilitating business etc.

What have been described are certain aspects of a system to demonstrate and sell computer programs which constitute presently preferred embodiments of the invention. It is understood that the foregoing description and accompanying illustrations are merely exemplary and are in no way intended to limit the scope of the invention, which is defined solely by the appended claims and their equivalents. Various changes and modifications to the preferred embodiments will be apparent to those skilled in the art. Such changes and modifications may include, but are not limited to: use of transmission medium other than television cable to deliver programming including: open air, satellite, fiber optic, and microwave broadcasts; organization of broadcasted materials could be reorganized in many different ways including blocks of unequal lengths, encoded transmissions, two way request/response structure etc.; options to purchase a program occurring after or separately from the program loading; two way communication medium used to deliver programming and/or finalize purchases, including such medium as: phone, two way cable, fiber optic, high speed data phones etc.; communications to facilitate purchase being made by RF transmission, satellite etc. Such changes and modifications can be made without departing from the spirit and scope of the invention. Accordingly it is intended that all such changes and modifications be covered by the appended claims and equivalents.

We claim:

1. A vending system for retailing at least one computer program comprising:
    a retailed computer program;
    a transmitting unit including means for repetitively transmitting said retailed computer program;
    a medium of transmission comprising cable television cable, said transmission medium being in communication with said transmitting unit and carrying said retained computer program repetitively transmitted by said transmitting unit, said transmission medium simultaneously carrying other signals comprising television signals;
    a plurality of computing devices located in domiciles, each of said computing devices including a receiver in communication with said transmission medium, each of said receivers being able to access and receive said retailed computer program repetitively transmitted by said transmitting unit through said transmission medium, and each of said computing devices comprising a processing section able to execute said retailed computer program to provide trail use of said retailed computer program to users of said computing devices in their domiciles, said trial use providing full use of said retailed computer-program;
    a vending program transmitted through said transmission medium to said computing devices, each of said computing devices being able to execute said vending program to provide means for said users of said computing devices to purchase reusable copies of said retailed computer program in their domiciles, said reusable copies of said retailed computer program being adapted for use on one of said computing devices; and
    said vending system including means to prohibit unauthorized duplication of said retailed computer program.

2. The vending system of claim 1, wherein said transmitting unit repetitively transmits a plurality of retailed computer programs through said transmission medium to said plurality of computing devices, and wherein said computing devices are capable of executing said plurality of retailed computer programs.

3. The vending system of claim 1 wherein said computing devices comprise a personal computer as processing apparatus.

4. The vending system of claim 1 wherein said computing devices comprise, as processing apparatus, an entertainment computing device utilizing replaceable read-only memory cartridges that provide game functions.

5. A vending system for selling computer programs comprising:
- a retailed computer program;
- a transmitting unit for repetitively transmitting said retailed computer program;
- a medium of transmission, said transmission medium being in communication with said transmitting unit, and said transmission medium carrying said retailed computer program repetitively transmitted by said transmitting unit;
- a computing device in communication with said transmission medium, said computing device including receiving apparatus to receive said retailed computer program from said transmission medium and having processing apparatus able to execute said retailed computer program repetitively transmitted through said transmitting medium,
- said computing device being located in a domicile to provide trial use of said retailed computer program to a user of said computing device in the user's domicile, said trial use providing complete use of said retailed computer program;
- a vending program transmitted through said transmission medium to said computing device, said computing device being able to execute said vending program to provide means for said user of said computing device to purchase reusable copies of said retailed computer program in the user's domicile; and
- said vending system including means to prohibit unauthorized duplication of said retailed computer program.

6. The vending system of claim 5 wherein said transmission medium comprises cable television cable.

7. The vending system of claim 5 wherein said transmitting unit repetitively transmits a plurality of retailed computer programs through said transmission medium to said computing device.

8. The vending system of claim 5 wherein said computing device comprises, as said processing apparatus, a personal computer.

9. The vending system of claim 5 wherein said computing device comprises, as said processing apparatus, an entertainment computing device utilizing replaceable read-only memory cartridges that provide game functions.

10. The vending system of claim 5 wherein said receiving apparatus of said computing device is not integral with said processing apparatus of said computing device.

11. The vending system of claim 5 wherein said transmission medium is a common carrier medium.

12. The vending system of claim 5, comprising a plurality of said computing devices, 13. A method of protecting demonstrated retailed computer programs from unauthorized duplication comprising the steps of:
- repetitively transmitting a retailed computer program through one-way media to a computing device, such that said computing device executes routines in said retailed computer program and a user of said computing devices has full use of said retailed computer program, and such that said computing device at no single time has a true, accurate and complete copy of said retailed computer program within said computing device, thereby preventing unauthorized duplication of said retailed computer program by eliminating the presence within said computing device, at any single time, of a true, accurate and complete copy of said retailed computer program.

14. The method of claim 13 wherein said one-way media comprises cable television cable.

15. A method of protecting demonstrated retailed computer programs from unauthorized duplication comprising the steps of:
- transmitting primary data comprising a retailed computer program through one-way media to a computing device in communication with said one-way media and said computing device executing routines in said retailed computer program, at least one of said routines in said retailed computer program requiring additional data to be correctly executed, and
- after said computing service has commenced executing at least one of said routines, accessing said primary data carried by said one-way media to obtain said additional data, thereby providing full use of said retailed computer program, whereby unauthorized duplication of said retailed computer program is prevented by the at least one routine within said retailed computer program, in order to be correctly executed, requiring data obtained by accessing additional data carried by said one-way media.

16. A method to protect demonstrated retailed computer programs from unauthorized duplication comprising the steps of:
- repetitively transmitting data to a computing device through a one-way media, executing a retailed computer program with said computing device, said computing device being in communication with said media while executing said retailed computer program, said retailed computer program requiring said computing device to communicate with said media to correctly execute said computer program to thereby provide full use of said retailed computer program while said computing device is in communication with said media, and to prevent unauthorized duplication of said retailed computer program by requiring communication with said media during execution of said retailed computer program in order to correctly execute said retailed computer program.

17. Apparatus to provide education coordinated between a student's home and a student's school, comprising:
- a computer program having educational content;
- a one-way medium of transmission;
- a transmitting unit in communication with said medium, said transmitting unit repetitively transmitting said computer program through said medium;
- a plurality of computing devices, at least one of said computing devices being located in a school, and at least one of said computing devices being located in a home of a student attending said school,
- said plurality of computing devices being in communication with said medium, and each of said computing devices having apparatus to receive transmission from said medium and having apparatus to execute said computer program transmitted through said medium, so that a student may receive education coordinated between the student's home and school by using said transmitted computer program having educational content on the computing device located in the student's home, and again by using said transmitted computer program having educational content on the computing device located in the student's school; and said apparatus providing full use of said computer program in the student's home and the student's school and said apparatus including means for preventing unauthorized duplication of said computer program.

18. The apparatus of claim 17 wherein said computing devices are located in homes of a plurality of students attending said school.

19. The apparatus of claim 17 wherein at least two of said computing devices are located in said school.

20. The apparatus of claim 17 wherein said one-way medium comprises cable television cable.

21. The apparatus of claim 17 wherein said computing devices are personal computers.

22. The apparatus of claim 17 wherein said computing devices are entertainment computing devices utilizing replaceable read-only memory cartridges that provide game functions.

* * * * *